United States Patent

Bradford

[11] Patent Number: 5,928,513
[45] Date of Patent: Jul. 27, 1999

[54] SPIN-ON FILTER

[75] Inventor: Peter Francis Bradford, Sheerness, United Kingdom

[73] Assignee: Lucas Industries, Solihull, United Kingdom

[21] Appl. No.: 09/010,323

[22] Filed: Jan. 21, 1998

[30] Foreign Application Priority Data

Feb. 21, 1997 [GB] United Kingdom ............ 9703618

[51] Int. Cl.$^6$ ................................. B01D 27/08
[52] U.S. Cl. ....................... 210/443; 210/DIG. 17
[58] Field of Search .................... 210/439, 440, 210/443, 444, DIG. 17, 435, 450

[56] References Cited

U.S. PATENT DOCUMENTS 3,490,597  1/1970  Casaleggi ..................... 210/443

FOREIGN PATENT DOCUMENTS 1 436 318     10/1968   Germany.
38 13775 A1   11/1989   Germany.
2 195 914      4/1988   United Kingdom.

Primary Examiner—Matthew O. Savage
Attorney, Agent, or Firm—Wells, St. John, Roberts, Gregory & Matkin, P.S.

[57] ABSTRACT

A filter comprises a housing, a support member located within the housing and an adapter member securing the support member to the housing. The support member is provided with a coupling component in the form of a screw-threaded opening for cooperation with a screw-threaded projection of a filter head to secure the filter housing to the filter head.

10 Claims, 3 Drawing Sheets

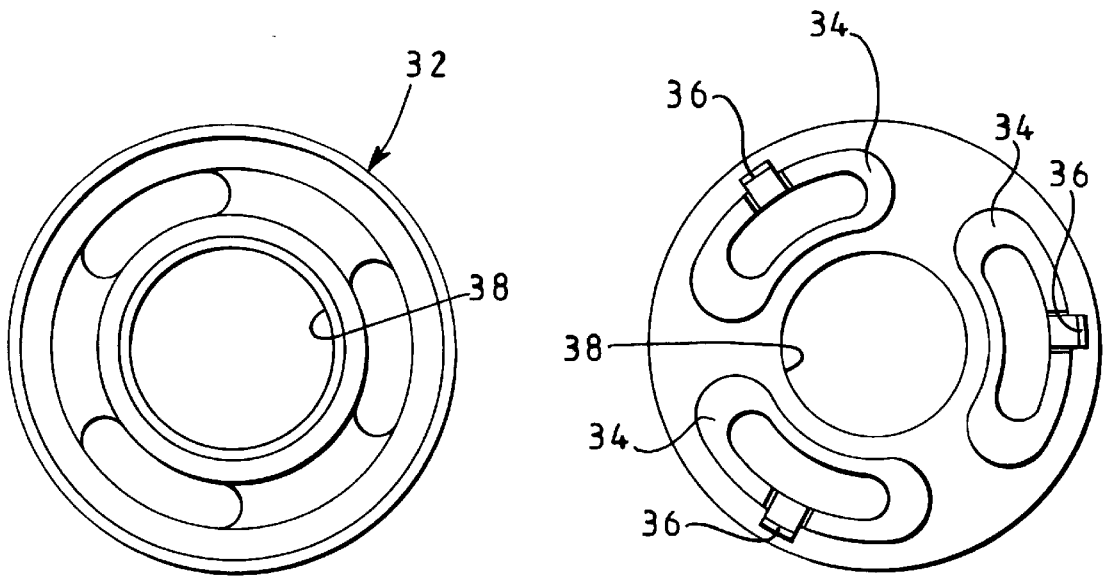
FIG 3a
FIG 3b
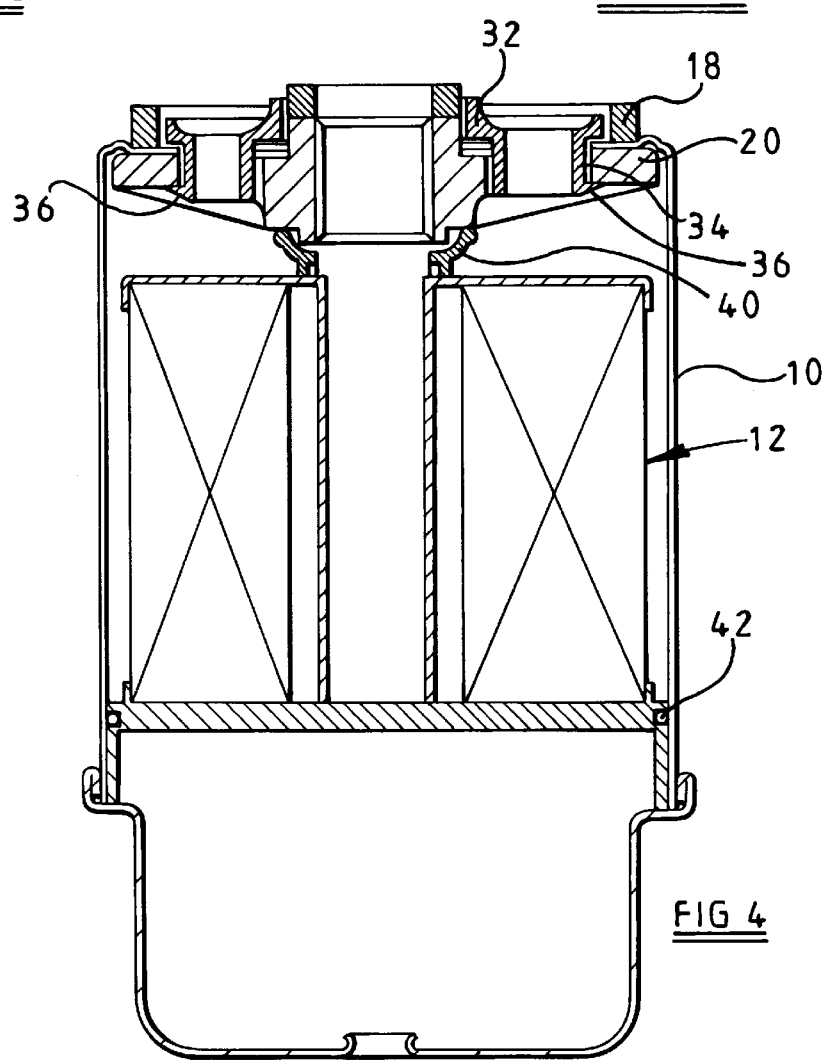
FIG 4

SPIN-ON FILTER

This invention relates to a filter for use in removing contaminants from a supply of fuel to a high pressure fuel pump. In particular, this invention relates to a filter arranged to be secured to a filter head by means of a screw-threaded projection of the filter head engaging with a screw-threaded part of the filter. Such a filter is known as a "spin-on" filter.

According to the present invention there is provided a filter comprising a housing, a support member located within the housing, the support member being provided with an opening aligned with an opening provided in the housing, the support member being shaped to define a coupling component arranged to cooperate with a corresponding coupling component provided on a filter head, in use, and means for securing the support member to the housing.

Conveniently, the coupling component of the support member comprises a screw-thread formation provided on the wall defining the opening, the screw-thread formation being arranged to cooperate with a screw-threaded projection of the filter head.

The means for securing the support member to the housing preferably comprises an adapter member located outside of the housing and including projections which extend through openings provided in the housing and cooperate with the support member. The projections conveniently engage the support member in a snap-fit manner.

The invention will further be described, by way of example, with reference to the accompanying drawings, in which:

FIGS. 3a and 3b are views similar to FIGS. 2a and 2b of the adapter member; and

FIGS. 4 and 5 illustrate alternative embodiments.

Figure 1:
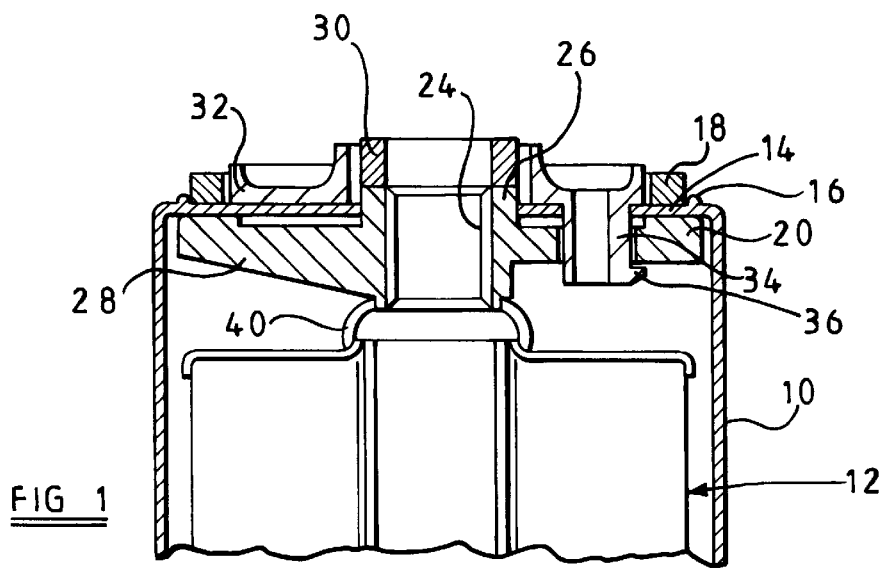
FIG. 1 is a sectional view of part of a filter in accordance with an embodiment.

FIG. 1 illustrates part of a filter which comprises a generally cylindrical filter housing 10 within which a cylindrical filter cartridge 12 is located. The filter cartridge 12 is of the type in which fuel flows through a generally cylindrical filter medium from a radially outer position to a radially inner position. The upper end surface 14 of the filter housing 10 is provided with a centrally located opening and three equiangularly spaced elongate, arcuate openings. The end surface 14 is further provided, adjacent its outer periphery, with an annular ridge 16 which acts to locate an outer annular seal member 18. The annular ridge 16 may be omitted, if desired, depending upon the design of filter head with which the filter is to be used.

Figure 2A:
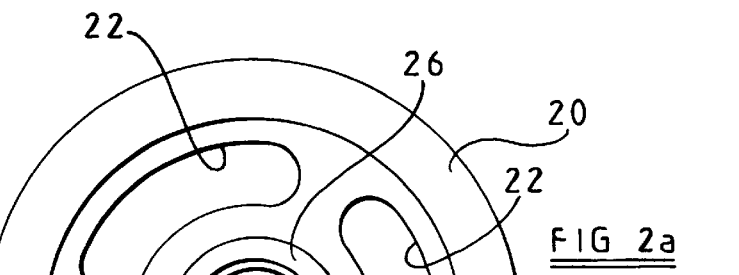
FIGS. 2a and 2b are views from above and below, respectively, of the support member of the FIG. 1 embodiment.
Figure 2B:
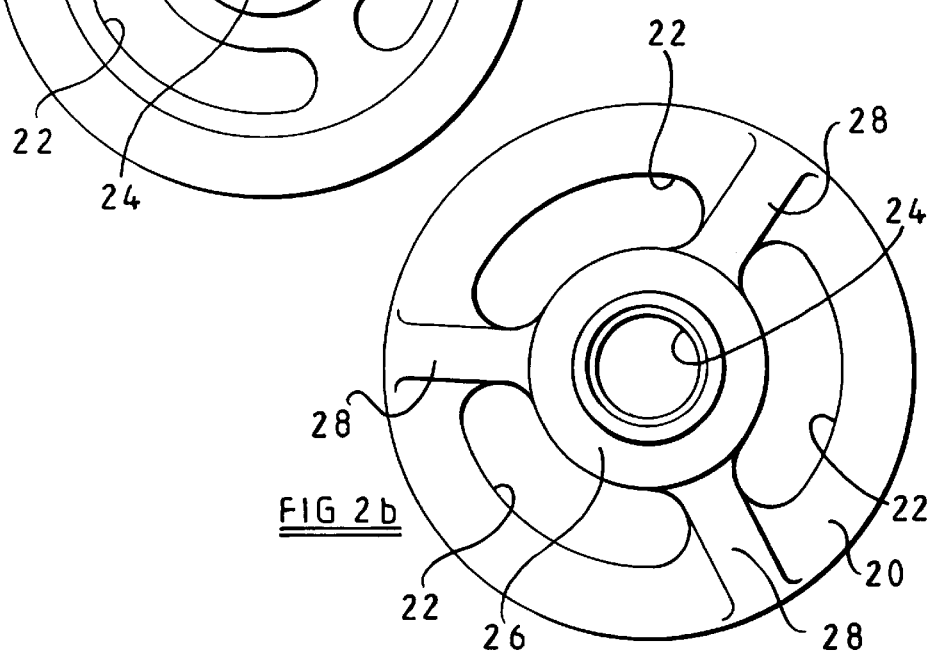

Located within the housing 10, and engaging the inner surface of the end wall 14 is a support member 20 constructed of aluminium, steel or an alternative suitable material. The support member 20 is of circular shape and is of diameter slightly smaller than the diameter of the housing 10. As illustrated in FIG. 2a and FIG. 2b the support member 20 is provided with three equiangularly spaced, arcuate openings 22 which align with the openings provided in the end surface 14 of the housing 10. The support member 20 further includes an axially extending, screw-threaded opening 24 which extends through a centrally located boss 26 which projects above the upper surface of the support member 20, extending through the central opening of the end surface 14, and also extends below the lower surface of the support member 20. As shown in FIG. 2b, the support member 20 includes three equiangularly spaced, integral strengthening ribs 28 which extend from the downwardly projecting part of the boss 26 thus improving the rigidity of the support member 20. As shown in FIG. 1, an inner annular seal member 30 is carried by the upper part of the boss 26 and is in contact therewith to form a substantially fluid tight seal.

The filter further comprises a one piece plastics molded adapter member 32 which is of circular form having a diameter smaller than the diameter of the support member 20. The adapter member 32 includes three equiangularly spaced, downwardly extending arcuate, hollow projections 34, the dimensions of the projections 34 enabling the projections 34 to extend through the arcuate openings provided in the end surface 14 of the housing 10 and the openings 22 provided in the support member 20. The lower end of each projection 34 carries an integral, outwardly extending barb 36. The barbs 36 are sufficiently resilient to enable the projections 34 to be pushed through the openings 22 provided in the support plate 20, and after the projections 34 have been fully inserted through the openings 22, the barbs 36 engage the lower surface of the support member 20 to prevent removal of the adapter member 32 from the support member 20. The adapter member 32 includes an axially extending opening 38 of diameter greater than the boss 26, and the inner annular seal member 30 protrudes through the opening 38. The outer and inner peripheries of the adapter member 32 serve to locate the outer and inner seal members 18, 30.

In use, the filter is secured to a filter head by means of a screw-threaded, hollow projection carried by the filter head engaging the screw-threaded opening 24 provided in the support member 20. The filter head is shaped so as to include areas arranged to engage the inner annular seal 30 and outer annular seal member 18 to define an annular chamber which communicates with an inlet provided in the filter head. The filter head also includes an outlet which communicates with the interior of the hollow projection. It will be appreciated that the inner annular seal member 30 restricts fuel flow directly between the inlet and the outlet. The hollow projection is secured to the support member 20, and the interior of the hollow projection communicates with an axially extending, perforated tubular member extending through the filter member 12. The annular chamber which communicates with the inlet of the filter head communicates through the hollow projections 34 with the exterior of the filter member 12. In use, an appropriate pump is used to supply fuel to or draw fuel from the filter head resulting in fuel flow through the inlet of the filter head, and through the filter member 12 from a radially outward position to a radially inward position and from there through the axially extending tubular member to the outlet of the filter head. In some situations, flow in the reverse direction may be required, and this can be achieved by reversing the connections to the filter head.

It will be appreciated that the adapter member 32 secures the support member 20 to the filter housing 10 against angular movement of the support member 20 with respect to the filter housing 10, thus in order to secure the filter to the filter head, the filter is appropriately positioned with respect to the filter head and subsequently rotated with respect thereto in order to bring the screw-threads of the support member 20 into engagement with the screw-threaded projection of the filter head. Such rotation is continued until the filter is securely mounted upon the filter head and a sufficiently good seal has been achieved between the filter and filter head. The upper surface of the support member 20 may, as illustrated in FIG. 1, include a region which is spaced from the end surface 14, to ensure that the load applied to the end surface 14 is applied to that part of the surface 14 which is aligned with the outer annular seal member 18. Rotational movement is transmitted to the support member 20 through the projections 34, and the projections 34 are shaped to be able to withstand the forces which must be transmitted.

The housing 10 is open at its lower end to permit the insertion of the filter cartridge 12, and a seal ring 40 is provided to seal the upper surface of the filter cartridge 12 to the lower surface of the boss 26. The axial length of the filter housing 10 is selected depending upon the dimensions of the filter cartridge 12 to be housed therein, and the lower end of the housing 10 may be shaped appropriately to permit the connection of a separate filter bowl thereto, for example by provided threads or bayonet shapings adjacent the lower end of the filter housing 10. Alternatively, the bowl may be connected to the filter housing 10 by means of double seaming or by means of seam welding.

The arrangement illustrated in FIG. 4 is similar to that of FIGS. 1 to 3, although the shaping of the support member 20 and adapter member 32 is slightly different. Further, in this arrangement the end surface 14, adapter member 32 and support member 20 are each provided with four equiangularly spaced openings rather than three as in the arrangement illustrated in FIGS. 1 to 3. As shown in FIG. 4, the lower end of the filter cartridge 12 is sealed to the filter housing 10 by means of an O-ring 42. As an alternative to using the 0-ring 42, the lower end of the cartridge may be sealed to the housing 14 using an adhesive. The lower end of the filter cartridge 12 is further supported by a step defined by part of the bowl which is secured to the filter housing 10. The engagement of the filter cartridge 12 with the step compresses the seal ring 40 to provide a good seal between the upper surface of the filter cartridge 12 and the support member 20.

Figure 5:
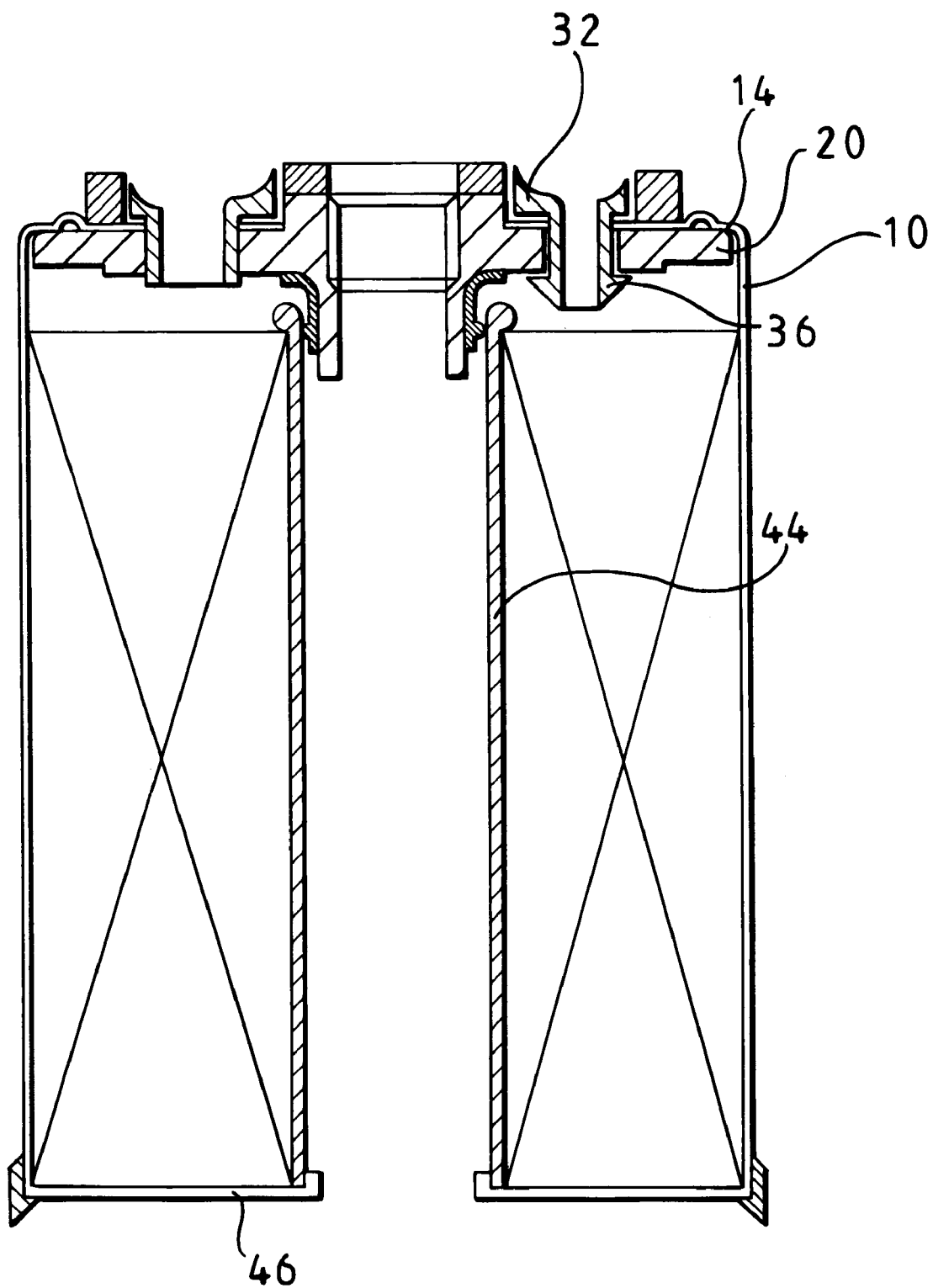

The arrangement illustrated in FIG. 5 differs from that described hereinbefore in that the filter is of the type in which fuel is filtered whilst following in a direction parallel to the axis of the filter rather than whilst flowing in a radial direction. No separate filter cartridge is provided, and instead the filter medium is supported by the filter housing 10, a lower perforated annular support plate 46 and an axially extending tube 44 which is supported by the plate 46 and sealed to the lower surface of the support member 20 in a manner similar to that described hereinbefore. In use, a bowl is secured to the lower end of the filter and defines a flow path between the lower end of the filter medium and the lower end of the axially extending tube 44. In use fuel flows to the upper end of the filter medium in a manner as described hereinbefore, the fuel flowing downwardly through the filter medium, through the bowl and upwardly through the axially extending passage to the outlet of the filter head.

In order to provide a sufficiently good seal with the member 20, the plate 46 must be of significant strength to transmit the required force to the seal ring 40. Alternatively, the plate 46 may be of weaker design but provided with legs which engage the bottom surface of the bowl to transmit the required force to the seal ring 40.

Although in the description hereinbefore the connection between the filter housing and filter head is by means of screw-threaded engagement between the support member and filter head, it will be appreciated that other types of coupling could be used, for example bayonet-type coupling rather than screw-threaded coupling. It will also be understood that the coupling components may be provided on a projection forming part of the support member and upon the wall of the filter head defining an opening therein, if desired.

It will be appreciated that the arrangement in accordance with the invention is advantageous in that the end surface 14 of the filter housing 10 is not provided with welds or other shapings to permit the filter housing to be secured to the filter head, thus it is relatively easy to provide an arrangement in which a good seal can be achieved between the filter housing 10 and the filter head.

Although the illustrated embodiments include arcuate openings in the end surface 14 and support member 20, it will be appreciated that these openings, and the projections 34, may be of other shapes.

The arrangement in accordance with the invention has the advantage that, during manufacture, should part of the filter be found to be faulty, only that part needs to be replaced, rather than the complete assembly.

I claim:

1. A filter arranged to be secured to a filter head having a coupling component, the filter comprising a housing within which a filter medium is located, the housing having an end surface, an inlet and an outlet, the filter medium being arranged such that fluid flowing between the inlet and the outlet passes through the filter medium, a support member located, at least in part, within the housing, the support member being provided with an opening aligned with an opening provided in the housing, the support member being shaped to define a coupling component arranged to cooperate with the coupling component of the filter head, in use, and means for securing the support member to the housing, the means for securing the support member to the housing comprising an adapter member located externally of the housing, the adapter member including a plurality of axially extending projections arranged to extend through respective, aligned openings provided in the end surface of the housing and the support member, with the end surface disposed between the support member and the adapter member, and to cooperate with the support member.

2. A filter as claimed in claim 1, wherein the coupling component of the support member comprises a screw-thread formed on the opening provided by said support member, the coupling component of the filter head comprising a screw-threaded projection.

3. A filter as claimed in claim 1, wherein the projections engage the support member in a snap-fit manner.

4. A filter as claimed in claim 1, wherein the projections are hollow and define a fuel flow path.

5. A filter as claimed in claim 1, wherein the adapter member is shaped to locate seal members which, in use, are located between the housing and the filter head to form substantially fluid tight seals therebetween.

6. A filter arranged to be secured to a filter head having a coupling component, the filter comprising a housing within which a filter medium is located, the housing having an end surface, an inlet and an outlet, the filter medium being arranged such that fluid flowing between the inlet and the outlet passes through the filter medium, a support member located, at least in part, within the housing, the support member being provided with an opening aligned with an opening provided in the housing, the support member being shaped to define a coupling component arranged to cooperate with the coupling component of the filter head, in use, and an adapter member located externally of the housing, the adapter member including a plurality of axially extending projections arranged to extend through respective, aligned openings provided in the end surface of the housing and the support member, with the end surface disposed between the support member and the adapter member, and to cooperate with the support member.

7. A filter as claimed in claim 6, wherein the coupling component of the support member comprises a screw-thread formed on the opening provided by said support member, the coupling component of the filter head comprising a screw-threaded projection.

8. A filter as claimed in claim 6, wherein the projections engage the support member in a snap-fit manner.

9. A filter as claimed in claim 6, wherein the projections are hollow and define a fuel flow path.

10. A filter as claimed in claim 6, wherein the adapter member is shaped to locate seal members which, in use, are located between the housing and the filter head to form a substantially fluid tight seal therebetween.

* * * * *